(12) United States Patent
Agarwal et al.

(10) Patent No.: US 8,930,440 B2
(45) Date of Patent: Jan. 6, 2015

(54) SYSTEMS AND METHODS FOR ENABLING MOBILE MASHUPS

(75) Inventors: Vikas Agarwal, New Delhi (IN); Sunil Goyal, Haryana (IN); Sumit Mittal, Uttar Pradesh (IN); Sougata Mukherjea, New Delhi (IN); John Ponzo, Hawthorne, NY (US); Fenil Shah, Edgewater, NJ (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 12/825,978

(22) Filed: Jun. 29, 2010

(65) Prior Publication Data

US 2011/0320525 A1    Dec. 29, 2011

(51) Int. Cl.
*G06F 15/16* (2006.01)
*H04M 1/725* (2006.01)

(52) U.S. Cl.
CPC ...... *H04M 1/72561* (2013.01); *H04M 2250/52* (2013.01); *H04M 2250/10* (2013.01)
USPC ....................................................... 709/203

(58) Field of Classification Search
CPC ......... H04L 69/22; H04L 69/32; H04L 63/00; H04L 67/00; H04L 67/306; H04W 4/02; H04W 4/185; H04W 4/206; H04W 4/043
USPC ......... 709/203, 201, 217, 218, 219, 220, 223, 709/225, 227, 240, 243; 715/700–866
See application file for complete search history.

(56) References Cited

U.S. PATENT DOCUMENTS

| | | | |
|---|---|---|---|
| 7,234,111 B2 | 6/2007 | Chu et al. | |
| 7,240,327 B2 | 7/2007 | Singh et al. | |
| 8,549,481 B2 * | 10/2013 | Birsan et al. | 717/125 |
| 2003/0070061 A1 | 4/2003 | Wong et al. | |
| 2008/0082539 A1 * | 4/2008 | Doane et al. | 707/9 |
| 2008/0109483 A1 | 5/2008 | Yoo et al. | |
| 2008/0147671 A1 | 6/2008 | Simon et al. | |
| 2008/0298342 A1 * | 12/2008 | Appleton et al. | 370/351 |
| 2008/0301643 A1 * | 12/2008 | Appleton et al. | 717/124 |
| 2008/0320381 A1 * | 12/2008 | Sercel | 715/234 |
| 2009/0100367 A1 * | 4/2009 | Dargahi et al. | 715/769 |
| 2009/0129575 A1 | 5/2009 | Chakraborty et al. | |
| 2009/0312033 A1 * | 12/2009 | Shen et al. | 455/456.1 |
| 2009/0313601 A1 * | 12/2009 | Baird et al. | 717/106 |
| 2010/0153530 A1 * | 6/2010 | Erickson et al. | 709/223 |

OTHER PUBLICATIONS

Brodt, Andreas, and Nicklas, Daniela, "The TELAR Mobile Mashup Platform for Nokia Internet Tablets", Proceedings of 11th International Conference on Extending Database Technology (EDBT), Nantes, France, Mar. 2008, available at www.edbt.org/Proceedings/2008-Nantes/papers/p700-Brodt.pdf as of Jun. 29, 2010.

* cited by examiner

*Primary Examiner* — Ruolei Zong
(74) *Attorney, Agent, or Firm* — Ference & Associates LLC (57) ABSTRACT

Methods and systems for enabling mobile mashups that amalgamate data and offerings from three dimensions: device features, Telecom network, and Web accessible services. Certain subject matter presented herein provides that this framework is established through middleware components, both on the server side as well as the device side, to provide support for mashing device and telecom interfaces. In addition, certain subject matter described herein provides for portability across different device platforms and different telecom operator networks.

20 Claims, 4 Drawing Sheets

SYSTEMS AND METHODS FOR ENABLING MOBILE MASHUPS

BACKGROUND

The subject matter described herein generally relates to applications comprised of content that is an amalgamation from multiple sources. In particular, certain subject matter presented herein relates to mashups. In addition, certain subject matter presented herein involves mobile device mashups involving the integration of telecom functionality, third party web services, and content and functionality available on the device.

Most modern mobile devices today have browsers that are HTML and JavaScript® standards compliant, and provide a rich, powerful web browsing experience to mobile users. The evolution of web browser functionality on mobile devices is the driving force for "mobile mashups," where content rendered on a device is amalgamated from multiple web sources. Such mashups can be enhanced to incorporate features unique to a mobile setting. One example is native device features, such as location and calendar information, camera, or Bluetooth, available on a mobile device platform. Another example is core telecom network functionality, such as SMS and Third Party Call Control (3PCC), exposed as services in a converged IP/web network setup.

A large number of web accessible services publish their data and offerings in the form of open interfaces for the developer community. Mashups are applications that create new innovative services by integrating such interfaces from multiple sources, and have become very popular in recent years. Although in the beginning, mashups were primarily created for desktop-based browsers, they are quickly gaining traction in the mobile domain as well. Adoption of mobile device mashups is driven in large part by the evolution of web browsers on the mobile device. A large percentage of modern mobile devices, such as smart phones, have browsers that are HTML and JavaScript® standards compliant, and provide a rich, powerful web browsing experience. With rapid enhancements in computing power, memory, display and other features of mobile devices, and with continuous improvement in mobile network bandwidth, mobile mashups bear the potential of being as successful as the desktop versions.

To help developers rapidly create rich mobile applications, popular platform vendors offer extensive middleware support, such as access to the underlying operating system, middleware components, useful libraries and tools. In addition, most platforms also expose interfaces that provide access, from within the applications, to a variety of features available on the mobile handset. Such features include information (for example, user contacts, calendar, or geographic location) as well as functionality (for example, making calls, sending SMS messages, or using the device camera). Richer applications for a mobile platform can be composed by combining application logic with these features and functionalities. For example, using the location information available on the mobile phone, a number of useful location-based applications can be created, such as directory services or workforce management solutions. Another example involves utilizing a camera on the device with various mobile applications related to bar-code scanning and decoding. In many instances, it is most desirable that such device features be integrated with other web offerings to enhance the user's mashup experience.

Another trend relevant for mashups involves the willingness of telecom operators to move from a walled-garden model to an open-garden model. With telecom markets reaching saturation, revenue from voice calls is decreasing. In addition, alternate telecom operator services such as games, news, or ring tones are also facing strong competition from similar offerings provided by, for example, internet content providers. However, telecom operators are still unmatched in their core functionalities of location, presence, and call control. These functionalities are characterized further by carrier-grade Quality-of-Service (QoS) and high availability. As such, a potential revenue channel for telecom operators is to open these functionalities as services to developers for creating new innovative applications. For example, location and presence information from a telecom operator can be combined with offerings from social networking websites, to provide an enriched social networking mashup. Applied to mobile mashups, the opening up of a telecom network provides avenues for mashing these features with other services on the mobile web.

There currently exists an immense fragmentation in syntax and semantics of interfaces across various platforms. For example, on Android™, registration of a location alert leads to two sets of events: one for the device entering a proximity region, and the other associated with exiting. Android™ is a trademark of Google™ Inc. in the United States and other countries. In addition, multiple such events are generated, governed by an expiration period. On Nokia® S60®, on the other hand, only one event is generated when the device enters a proximity for the first time. Nokia® and S60® are trademarks or registered trademarks of the Nokia® Corporation in the United States and other countries. Furthermore, Android™ uses the Intent and IntentReceiver objects to realize a callback function for the alert mechanism, while S60® works through defining an implementation for the abstract ProximityListener class. There is also diversity in terms of the name of the interface, as well as in the name, data type and ordering of certain attached parameters. Moreover, the interfaces also differ in the set of exceptions thrown by the underlying platforms. As such, requirements for de-fragmentation arise because there is an inherent desire by platform vendors to differentiate their offerings from others, even though standardization efforts, such as J2ME®, exist in the mobile domain. J2ME® is a registered trademark of Oracle America, Inc.

The handling of network protocols associated with features of the telecom domain involves a high level of complexity. A number of legacy protocols exist in this domain, while new standards continue to be drafted and absorbed by different practitioners. For example, to help developers access telecom services without knowing the underlying protocol details, a standard called Parlay-X has been developed that exposes Web service interface for core Telecom functionalities. On similar lines, IP Multimedia Subsystem (IMS) provides a reference framework to expose these functionalities as services to web-engineered systems using the SIP standard. From a mashup creation perspective, this means that a developer has to deal with various Telecom specific protocols arising out of not only legacy implementations, but also different upcoming standards. To reduce the burden on the developer, an encapsulation model at the middleware level is needed that hides protocol specifics from the developer. Moreover, for a given functionality, this model should enable a seamless switch among different protocols. This is especially required in scenarios where the telecom networks are gradually evolving to move from legacy interfaces to standards like Parlay-X and SIP.

There are several professional tools in the industry that facilitate the creation of web based mashups. Examples are Yahoo!®, Pipes™, BEA AquaLogic®, and IBM® Lotus®

Mashups. Yahoo!®, and Yahoo! Pipes™ are trademarks or registered trademarks of Yahoo! of Yahoo Inc. in the United States and other Countries. BEA AquaLogic® is a registered trademark of BEA Systems, Inc. IBM® Lotus® Mashups is a trademarks or registered trademark of International Business Machines Corporation in the United States, other countries, or both. Most of these tools provide a browser-based assembly portal where developers can choose services made available by different web service providers, and integrate them in a mashup, all driven by a simple visual user interface. Academic research on mashup tools has also been undertaken, including spreadsheet-based web mashups.

Device browser fragmentation is a major challenge for mobile mashups. For example, although the mobile platforms discussed herein, iPhone®, Android™, and S60®, all make use of the WebKit™ browser engine, each platform has adopted a different WebKit™ version, and has replaced or extended various browser subsystems. WebKit™ is a trademark of Apple Inc. in the United States and other countries iPhone® is a registered trademark of Apple Inc. in the United States and other countries. In addition, there are situations where certain user interface elements in the browser do not provide the same user experience on all platforms.

For example, regarding the scrolling features of a browser, a web page might have more than one element in the current view that requires scrolling, such as an embedded iframe. A user might need to scroll inside the iframe to view its contents, and also scroll the outer page. The touch screen interface on the Nokia® S60® devices allows the user to focus on individual elements on the page via the stylus and scroll inside those elements. The iPhone®, on the other hand, does not provide the ability to focus on individual elements and can scroll only the outer most browser frame via the flick gesture. In such cases, the developer either needs to use different user interface elements on different platforms, or build a set that works well on all platforms.

Most mobile "smart phone" platforms today provide native APIs for several services, such as GPS location, address book and contacts, calendar, accelerometer, camera, and video. Despite the general need for accessing similar services during cross-device application development, there is a considerable level of API fragmentation. For example, APIs for common services in J2ME-based platforms have also become fragmented on platforms that support new hybrid Java runtimes, such as Android™. Fragmentation is further exacerbated on non-Java based platforms like iPhone®, which currently uses the Object-C language and the Cocoa user interface library. Various standardization efforts, such as Bondi by OMTP Limited, attempt to overcome this fragmentation. Similarly, PhoneGap® is an effort towards enabling uniform JavaScript® access to native APIs. PhoneGap® is a registered trademark of Nitobi Software Inc.

Session Initiation Protocol (SIP) is a standard being widely adopted by telecom operators to expose their core functionalities, such as voice service, SMS service, and call control using SIP. JSR-289 has been proposed by Sun Microsystems®, Inc. and Ericsson® to enhance existing SIPServlet specification and support development of composed applications involving both HTTP and SIP servlets. Web21C from British Telecom is a Web 2.0 based service aggregation environment that allows developers to integrate core telecom functionality with other Web services into a single application.

One of the major challenges in the area of mobile applications is the huge privacy and security implication around sensitive user information like location, contacts and calendar entries. Locaccino by Zipano Technologies, Inc. is location sharing system that gives a user flexibility to create rules with varying complexity for configuring privacy settings. However, it is a specific application and its design does not cater to mobile mashups in general.

In addition, Brodt et al., *The TELAR Mobile Mashup Platform for Nokia® Internet Tablets*, Proceedings of 11th International Conference on Extending Database Technology (EDBT), Nantes, France, March 2008 presents a mobile mashup platform that integrates data from Web-based services on the server side and utilizes users' context information from sensors to adapt the mashup at the client side. However, this framework lacks a comprehensive approach required for incorporating the three-dimensional mobile setting outlined in this invention and is currently limited to certain Nokia® devices.

BRIEF SUMMARY

Embodiments of the invention broadly contemplate systems and associated methods that provide a framework for enabling mobile mashups that amalgamate data and offerings from three dimensions: device features, Telecom network, and Web accessible services. Embodiments provide that this framework is established through middleware components, both on the server side as well as the device side, to provide support for mashing device and telecom interfaces. In addition, embodiments provide for portability across different device platforms and different telecom operator networks. Embodiments provide for two-way mobile mashups, utilizing services and features on both the client side (for example, a mobile browser) as well as from the server side, from a three dimensional setting: device features, telecom services, and third party services.

One aspect provides a system comprising: one or more computing devices each having one or more device features, the one or more computing devices configured to communicate device feeds of device feature information; one or more communication networks, each of the one or more communication networks having one or more network functionalities; one or more web content providers, each of the one or more web content providers having one or more web offerings; wherein the one or more device features, one or more network functionalities, and one or more web offerings are integrated into one or more mashup applications.

Another aspect provides a method comprising: providing one or more computing devices each having one or more device features, the one or more computing devices configured to communicate device feeds of device feature information; accessing one or more communication networks, each of the one or more communication networks having one or more network functionalities; accessing one or more web content providers, each of the one or more web content providers having one or more web offerings; wherein the one or more device features, one or more network functionalities, and one or more web offerings are integrated into one or more mashup applications.

A further aspect provides a computer program product comprising: a computer readable storage medium having computer readable program code embodied therewith, the computer readable program code comprising: computer readable program code configured to provide one or more computing devices each having one or more device features, the one or more computing devices configured to communicate device feeds of device feature information; computer readable program code configured to access one or more communication networks, each of the one or more communication networks having one or more network functionalities; computer readable program code configured to access one or more web content providers, each of the one or more web content providers having one or more web offerings; wherein the one or more device features, one or more network functionalities, and one or more web offerings are integrated into one or more mashup applications.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Existing technology provides numerous techniques for creating mashups. However, these existing techniques are insufficient to fully utilize the three-dimensions present in the mobile device domain, namely internet services, native device features and telecom services. In order to amalgamate these resources into a mashup application, developers must account for multiple aspects of the mashup. These aspects include, but are not limited to, the processing and integration of content, rendering of integrated content, device integration, web service invocation, and execution. According to embodiments of the invention, middleware is provided, both on the server side and the device side, to enable mashing of device and telecom network features. In addition, unlike existing mashups in which the client is responsible only for rendering the content it receives from a server, embodiments provide that the device participates as an active component. Further embodiments provide that various middleware components ensure portability and adaptation of mashups across different devices, while hiding the heterogeneity of mobile platforms and the complexity of telecom network protocols. As non-limiting examples, certain embodiments described herein implement mashup frameworks for three modern platforms: iPhone®, Android™, and Nokia® S60®. However, these particular devices serve as examples only, as the invention is not limited to enabling mobile mashups on mobile phones. Embodiments provide for enabling mobile mashups on mobile devices capable of being configured according to embodiments of the invention, including, but not limited to, portable digital assistants, portable media players, handheld ruggedized devices, and various mobile internet devices.

Figure 1:
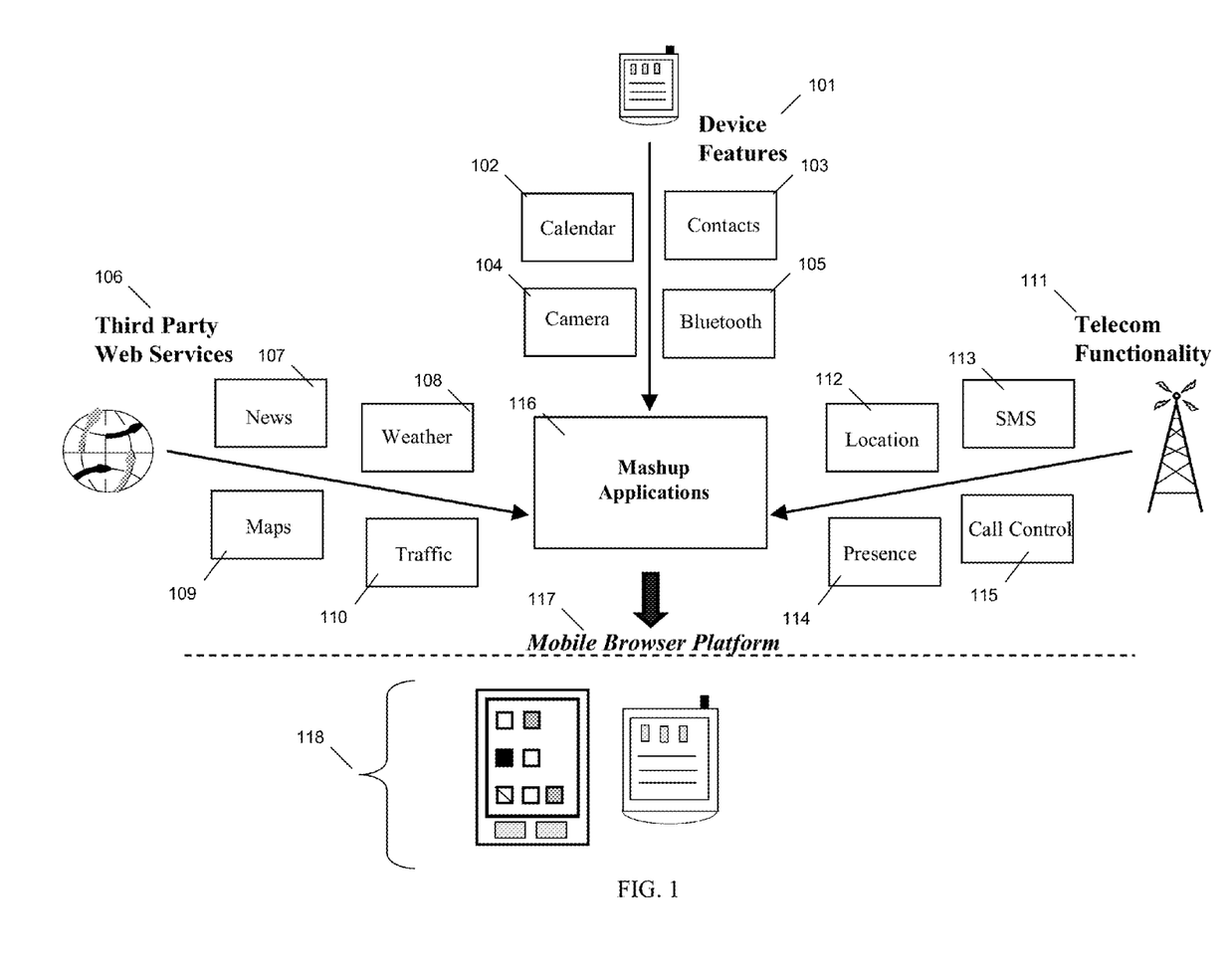
FIG. 1 high-level illustration of the convergence of telecom services, device features and web offerings and the rendering of such content to mobile devices

Referring now to FIG. 1, therein is a high level depiction of the convergence of telecom services, device features and web offerings and the rendering of such content to a mobile device according to embodiments of the invention. The services and features depicted serve as a non-limiting examples typical of those currently available on different mobile devices, such as the Android™, iPhone®, Nokia® S60® device platforms.

As shown in FIG. 1, embodiments of the invention obtain device features 101, third party web services 106, and telecom functionalities 111. Non-limiting examples of device features 101 include calendars 102, contacts 103, cameras 104, and Bluetooth functionality 105. Device features 101 according to embodiments of the invention includes both device data and device functionality. Illustrative telecom functionality 111 includes, but is not limited to, location 112, SMS 113, presence 114, and call control 115. Non-limiting examples of third party web services 106 include news 107, weather 108, maps 109, and traffic 110. According to embodiments of the invention, device features 101, third party web services 106, and telecom functionalities 111 can be obtained and combined to create a mashup application 116. An available mobile browser platform 117 may be utilized by the various mobile devices 118 to access the mashup applications 116.

As a non-limiting example, a current GPS-based location could be obtained from the device and combined with the device contacts (for example, contacts from the device's address book) to project friends on a web-based map service such as Google Maps™. Google Maps™ is a trademark of Google Inc. in the United States and other countries. Another non-limiting illustration involves a device with a camera functionality, wherein this functionality could be embedded within a mashup application to allow users to click and share pictures with others in real-time. A further non-limiting example utilizing telecom functionalities involves a presence server hosted by a telecom provider which can offer current presence information (for example, device availability, off-hook, on-hook status) of individuals listed in the device's contact list. The presence and contacts information could be utilized to effectively manage communication during project collaboration. In addition, other communication features from the telecom network space, like the Third Party Call Control service, or other messaging services, can also be incorporated to develop similar mashup applications. As the examples illustrate, converging such content holds advantages not only for the creation of new mashups applications, but also for existing applications. As a non-limiting example, a web chat client, such as Google Talk™, could be enriched by using device features such as GPS or a camera function, as well as telecom network offerings such as call, SMS, or MMS. Google Talk™ is a trademark of Google Inc. in the United States and other countries.

Existing mashup technology lacks the ability to utilize the three dimensional convergence present in the mobile domain, the three dimensions being the device features, web services, and telecom functionalities as depicted in FIG. 1.

In current mashups, including mashups for non-mobile clients, such as desktop computers, the client is responsible only for rendering the content it receives from the server. However, the inventors have recognized that for mashups involving mobile devices ("mobile mashups"), the device is especially suited to act as an active component, augmenting a mashup with its own information and features. Although this description focuses largely on mobile computing devices, non-mobile devices, such as desktop computers, may also act as active mashup components utilizing their own information and features. Accordingly, embodiments of the invention provide for a client-server model for mashups utilizing middleware enhancements to provision (a) a two-way flow of information—from device to server, apart from server to device, and (b) a two-way mashup support where the device and telecom features can be used both on the server (during processing and content integration) and the client (during mashup rendering and execution).

Embodiments provide for the two-way flow of information by allowing feeds of device information to the server, while provisioning the server to receive those feeds. Embodiments provide for two-way mashup support by requiring a different set of mashable interfaces for each feature from the telecom and device domains. According to an embodiment of the invention, telecom services are handled through the exposure of interfaces in various programming languages, including, but not limited to, Java, PHP, and C, for inclusion in the server-side mashup, while for the device-side mashup, REST-based interfaces invocable through JavaScript® may be provided. Embodiments provide support for device features through required interfaces in a specified format, (for example, JavaScript®) to allow inclusion during mashup execution on the device. In addition, embodiments provide that telecom and device feature interfaces, including, but not limited to API's, may be integrated into existing development tools.

Mashups according to embodiments of the invention require interfaces that can be embedded in a web programming model, such as JavaScript®. As such, on a given mobile platform, embodiments of the invention first need a bridge that takes the native APIs and exposes them in a web mashable form. Embodiments provide that such a bridge has two distinct attributes. The primary attribute corresponds to support for bidirectional communication between the mobile browser and the native APIs, so that (a) input objects required for invoking a native feature can be passed from within the mashup, through the browser, and to the underlying platform, and (b) output objects available as a result of native invocation can be marshalled back to the mashup through the browser. The second bridge attribute involves the provision of proper callback handling: callbacks generated in the native context, for example, those related to proximity alerts on a mobile platform, should lead to appropriate signaling and notification in the invoking browser context of a mashup.

Figure 2:
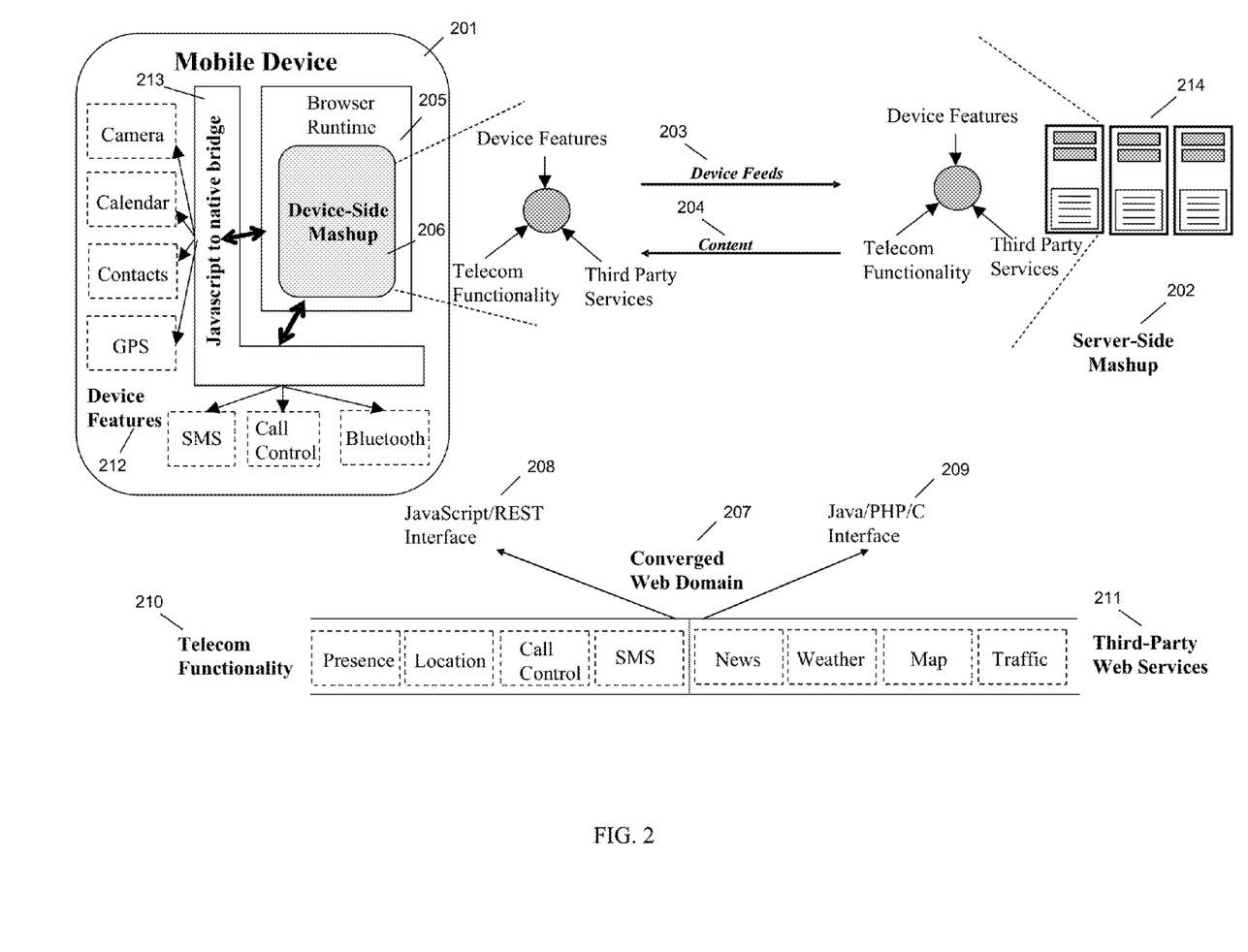
FIG. 2 depicts a mashup comprised of two portions running in conjunction, one on the server side and the other on device.

Referring now to FIG. 2, therein is depicted a mashup comprised of two portions running in conjunction, one on the server side and the other on device, according to an embodiment of the invention.

As shown in FIG. 2, embodiments of the invention provide for a mobile device 201, comprised of, among other components, a browser runtime 205, device features 212, and a bridge 213, such as the non-limiting example of a JavaScript® to native bridge depicted in this figure. In the embodiment depicted in FIG. 2, telecom functionalities 210 and third-party web services 211 are also included and relate to a converged web domain 207. Interfaces 208, 209 are utilized between the converged web domain 207 and the mobile device 201 and the servers 214. The embodiment illustrated in FIG. 2 provides a JavaScript®/REST interface 208 for the mobile device 201 and a Java/PHP/C interface 209 for the servers 214. As shown in FIG. 2, embodiments of the invention provide for content 204 to be utilized by the mobile device 201, while device feeds 203 are utilized on the server side 214. Ultimately, the system depicted in FIG. 2 leads to the creation of mashups for both the device 206 and the server 202.

As shown in FIG. 2, embodiments provide that a client, the mobile device 201 in this particular figure, is an active component in the mashup. In addition, both the server side 214 and the client side 201 can make use of all the three dimensions: third-party web services 211, telecom functionality 210, and client device features 212. According to embodiments of the invention, the server side mashup 202 may execute on a web server and may be configured to deal with processing and integration of content received from each dimension. The device side portion 206, on the other hand, may be configured according to embodiments of the invention to reside on the browser context of different platforms, such as iPhone®, Android™ or Nokia® S60®, and to render the content received from the servers 214. Embodiments provide that through client-side scripts, including, but not limited to, JavaScript® and AJAX, the device-side mashup 206 executes telecom functionality 210, third-party web offerings 211, and device features 212. In addition, embodiments provide that the device-side mashup 206 also feeds device data 203, including, but not limited to, location and calendar data, to the server side component 202 for inclusion in the processing logic.

Figure 3:
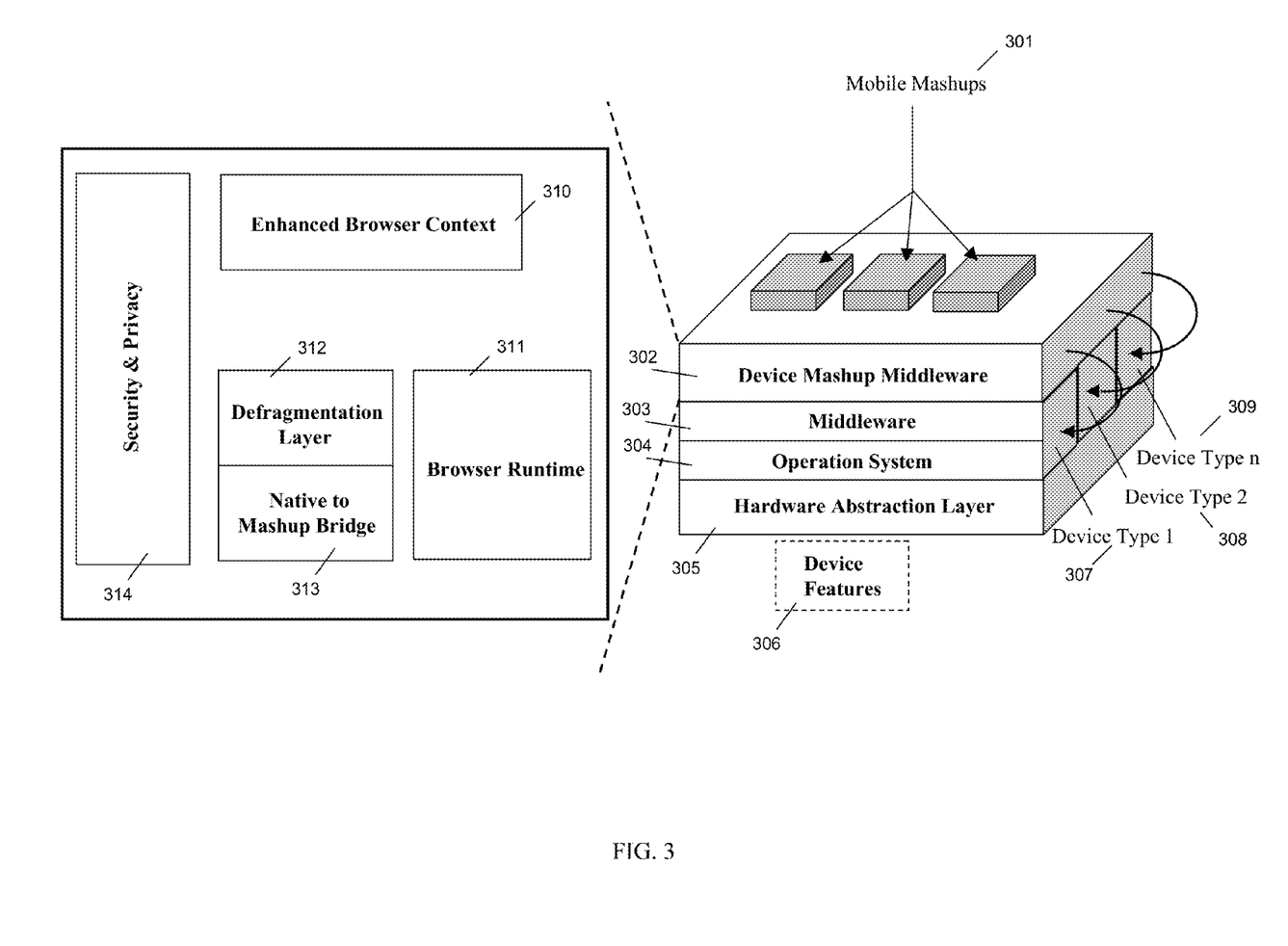
FIG. 3 depicts device middleware components.

Referring now to FIG. 3, therein is depicted an embodiment of the invention wherein device middleware components are utilized in creating device mashup applications.

As shown in FIG. 3, embodiments of the invention provide mobile mashups 301 running on top of device mashup middleware 302. In turn, the device mashup middleware 302 runs on top of existing platform support, including other middleware 303, operation systems 304, and a hardware abstraction layer 305. The device mashup middleware 302 is configured to interact with different types of mobile devices 307, 308, 309 which may be operating under different platforms. In addition, the device mashup middleware 302 provides an enhanced browser context 310 in which the client side mashups 301 execute.

According to embodiments of the invention, the enhanced browser context 310 uses the existing browser runtime 311 available in the platform to render HTML pages and execute the JavaScript® of the mobile mashups 301. In addition, the enhanced browser context 310 utilizes a native to mashup bridge 313 to allow access to device features 306 (for example, cameras, GPS functionality, and contacts) using interfaces (for example, JavaScript®) from within the mashup. As such, embodiments provide that the bridge 313 allows for bi-directional communication capability between the enhanced browser context 310 and the native APIs. Accordingly, aspects of the invention provide that this capability allows the browser context 310 to invoke native APIs, pass inputs and receive outputs, and allows the native APIs to invoke JavaScript® functions in the browser context for callback support.

Embodiments provide that the enhanced browser context 310 can be implemented in multiple ways. A first non-limiting example of implementing the enhanced browser context 310 according to embodiments of the invention involves modifying the source code of an existing browser on the platform to allow access to native capabilities through JavaScript®. Another non-limiting illustration provides for creating a plugin for the platform browser that exposes device capabilities without modifying the browser source code. A further non-limiting example involves embedding a browser runtime 311 (for example, core HTML and JavaScript® engines) within a native application, and extending the access points of this runtime to support invocation of native features from a mashup rendered through the runtime. Embodiments provide that, depending on the capabilities and support provided on the device platform, any of the three non-limiting examples can be used to implement an enhanced browser context 310.

As depicted in FIG. 3, the device mashup middleware 302 includes a defragmentation layer 312. Embodiments of the invention provide that the defragmentation layer builds on the JavaScript® interfaces exposed by the native to mashup bridge 313 and exposes a consistent set of mashable interfaces across various platforms to enable mashup portability. For example, the following listing defines a uniform API across Android™, iPhone®, and Nokia® S60® for invoking periodic location updates: startUpdatesOnTimeChange (timeFilter, callback, errorCallback, options). In contrast to the original APIs on these platforms, semantics of the above APIs as well as data structures of the parameters involved, such as timeFilter, are uniform across the platforms. Similarly, updates for location information, encapsulated in a location object are provided through a commonly defined callback method, while errors are propagated with the help of a common errorCallback method. In addition, a generic options parameter is also provided with the interface, which is optional and used to configure platform-specific attributes, such as Criteria in the case of S60®, Location Provider in the case of Android™, and accuracy for iPhone®. The structure and values of this parameter are platform dependent, and therefore should be strictly used only when a developer wishes to fine-tune mashups on a particular platform. For general usage, embodiments provide that null should be passed for this parameter, in which case default values for various attributes would be picked up on the corresponding platform.

The illustration provided by FIG. 3 demonstrates that the device mashup middleware 302 also includes a security and privacy layer 314 for, among other things, configuring certain policies. Accessing device and telecom features has a cost associated with it, such as sending an SMS or making a call, and might deal with sensitive personal information stored on the device, including location and calendar entries. As such, embodiments provide that the security and privacy layer 314 performs tasks associated with regulating access to these features. As a non-limiting example, the security and privacy layer 314 may intercept each request from within a mashup application for invoking a feature, and performs appropriate checks to determine whether the desired access should be allowed or not. In addition, embodiments provide that policies for various checks can be configured by the user when a mashup application is first accessed, and may even be refined over a period of time. As non-limiting examples, these policies could take into consideration different factors such as frequency of access, time of day, and current location to make automatic decisions or prompt the user for explicit approval.

Figure 4:
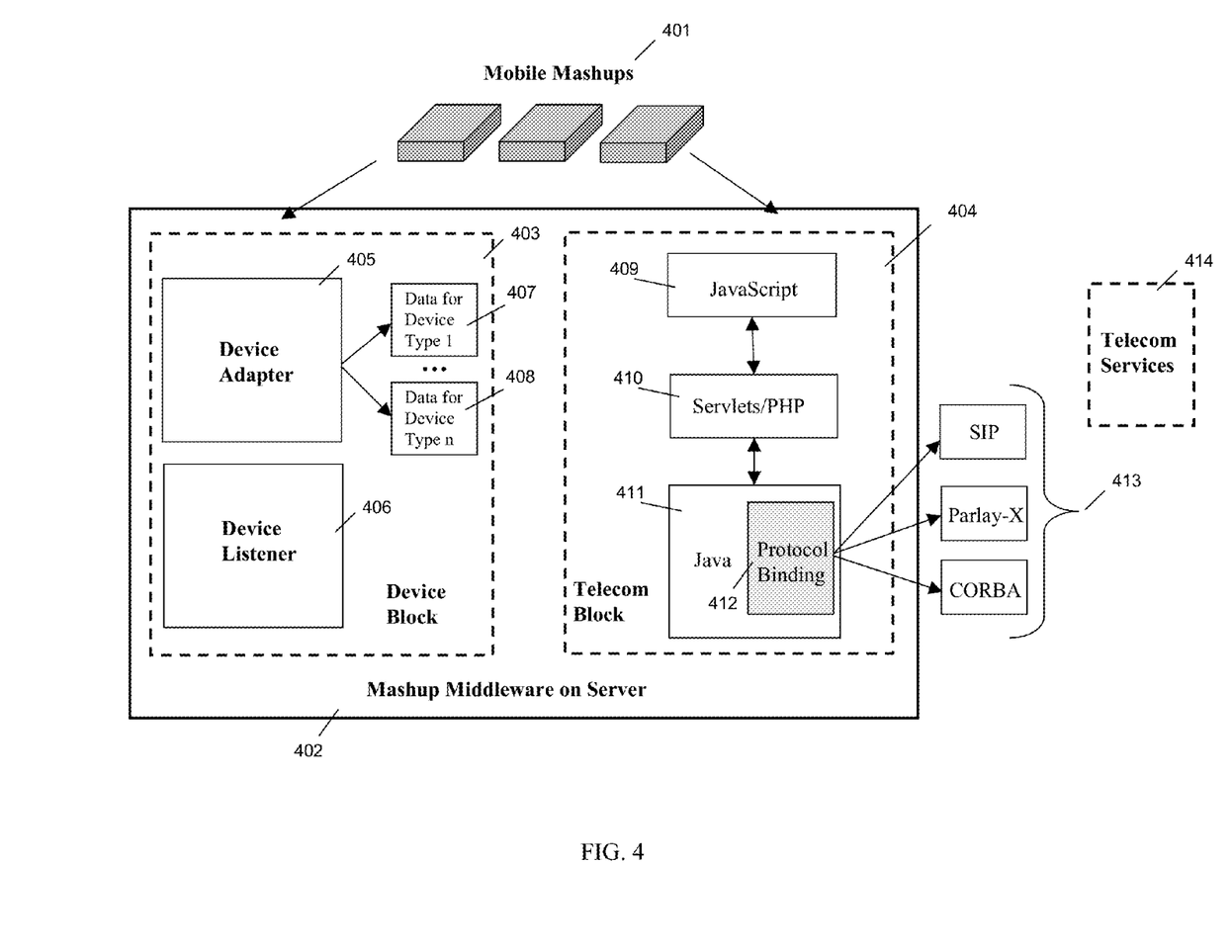
FIG. 4 depicts server middleware components.

Referring now to FIG. 4, therein is depicted an embodiment of the invention wherein server middleware components are utilized in creating mashup applications.

As shown in FIG. 4, embodiments provide that mobile mashups 401 run on server side middleware 402 that consists of two parts: a telecom block 404 that enables access to telecom network services 414, and a device block 403 that receives data feeds from mobile devices and performs adaptation of the mashup as per the device type using the data for the specific device type 407, 408.

The embodiment depicted in FIG. 4 also demonstrates that the telecom block 404 includes a protocol binding component 412 that connects to various telecom services 414 using the underlying network protocols 413 and interfaces with a programming language such as Java 411. As a non-limiting example, telecom service location information may be obtained using Parlay-X, presence information using SIP, and call control functionality using CORBA. Through the protocol binding component 412, the mashup framework removes the burden of having to know the telecom protocols, such as session management for SIP protocol, broker object for CORBA and SOAP headers for Parlay-X. Embodiments provide that once the binding is in place, the telecom block 404 provides mashable interfaces for different services in various programming languages, including, but not limited to Java, C, and C++. While these interfaces can be directly used in the server side mashup, embodiments provide that REST based interfaces are also exposed using servlet/PHP 410 so that services from the telecom domain can be invoked from client side mashups using JavaScript® 409.

Embodiments of the invention provide that binding stubs may enable seamless switching between different protocols 413. A non-limiting example involves a scenario where API for fetching network location information is exposed using both SIP and Parlay-X. In SIP, this information is obtained by subscribing to a presence server for the presence information, and parsing the returned document. Parlay-X, on the other hand, requires the request to be made using a SOAP envelope, and also returns the location information encapsulated under SOAP. Embodiments provide that these disparate steps may be wrapped under a generic getLocation( ) interface, and the same may be provisioned using corresponding stubs for Parlay-X and SIP. In addition, properties and attributes required for Parlay-X and SIP, such as service port information, tolerable delay, and accuracy, may be configured using an options parameter similar to the device middleware model depicted in FIG. 4.

Also shown in FIG. 4, the device block 403 consists of a device listener component 406 that receives feeds (for example, location and contacts) from a device side mashup and makes available this information to the server side mashup for processing. According to embodiments of the invention, these feeds may enable a mobile device to participate actively in a mashup by helping determine what content is generated at the server side.

The embodiment illustrated in FIG. 4 also includes a device adapter 405 within the device block 403 that performs device specific adaptation of mashups. As a non-limiting example, appropriate JavaScript® libraries, for device features, may need to be included in a mashup page depending on the device from where the mashup is being accessed. In addition, embodiments provide that the look and feel of a mashup can be adjusted based on mobile device properties, such as screen size or resolution by including appropriate CSS files. Furthermore, certain embodiments provide that any other device specific adaptation, for example, altering the layout of a mashup to resemble native look-and-feel, may be performed through the device adapter 405.

Embodiments of the invention provide that the server side middleware 402 can be hosted either on the service delivery platform (SDP) of a telecom provider or on a third party server. When the server side middleware 402 is hosted on a SDP, only telecom features from a single provider are available. When the server side middleware 402 is hosted on a third party server, multiple telecom operators can make their offerings available. In this case, embodiments of the invention provide that it is imperative for the telecom block to provide uniform APIs across different providers for enabling easy portability of mashups.

On various mobile device platforms such as, iPhone®, Android™, and Nokia® S60®, it is possible to embed a browser engine inside a native application that enables rendering of web content developed using artifacts like HTML, JavaScript®, and CSS. In addition, this feature allows native access to various browser DOM elements, for example the current URL, title and cookies. A first step in these non-limiting examples, according to embodiments of the invention, is the creation of mashup bridges on different platforms, and extending this embedded browser model to provision access points for native device capabilities such as GPS, camera, and contacts.

A non-limiting example of certain embodiments of the invention is provided by the Nokia® S60® mobile platform. The Symbian® Series 60 5th Edition of Nokia® contains a Browser class in the eSWT package for embedding a browser instance within a J2ME® Midlet application. Symbian® is a registered trademark of the Symbian Limited Corporation. An instance of this class not only provides means to visualize and navigate through HTML documents, but also supports attachment of listeners that receive events corresponding to changes in the URL, title and status text of the rendered content. Embodiments provide that for accessing native APIs through a mashup, a TitleListener is defined for the embedded browser that listens for title changes, and makes use of the following code template: currentTitle=window.title; window.title=<mashupDomain>:
Name=<deviceFeature>&Values=<values>;
window.title=currentTitle;

Embodiments of the invention provide that execution of this code first gets trapped inside the provided TitleListener, where it is interpreted as a request for executing a device feature with the passed values of associated parameters. For sending results from a native feature to the invoking browser instance, embodiments may utilize the setUrl( ) routine of the Browser class. For example, to invoke the callback function locObtained( ) attached to the getLocation( ) feature, embodiments may execute the following code: browser.setUrl("JavaScript®:locObtained(<Location>)"). The <Location> parameter corresponds to a String serialized JSON object of the location information.

Embodiments of the invention provide a defragmentation layer middleware component that absorbs differences in syntax and semantics of these JavaScript® interfaces across different platforms. In addition, embodiments provides that the heterogeneity of mobile features are handles through a three-step process: (1) a semantic step, where the structure of the interface is fixed in terms of the method name, associated parameters (including their name, ordering and dimensions), as well as the return value; (2) a syntactic step, in which the differences in data structures of various objects are removed; and (3) a binding step, which contains implementation of the common interface on top of the original platform offering, and also provides mechanisms to fine-tune an interface using platform specific attributes and properties.

A security and privacy layer is provided by certain embodiments of the invention. This layer may be utilized to configure policies pertaining to access of various device and telecom features. Embodiments provide that these policies are defined around three basic tenets or criteria: (1) the domain as determined by the URL of the mashup; (2) the context of the user as determined by user's current location and the current time; (3) and the frequency of access, for example, how often can a feature be accessed. In addition, embodiments provide that whenever a feature is invoked, it is first subjected to policies defined in this layer. According to certain embodiments, one of four options may exist for each access: (1) allowing a feature to be invoked, (2) denying the invocation, (3) partial invocation (for example, providing abstracted location information instead of available precise latitude and longitude coordinates), and (4) prompting the user for further clarification, before deciding upon the next action, such as allowing, denying or partial invocation. Furthermore, embodiments provide that the security and privacy layer may apply to both data features, such as location and calendar information, and functionality, such as SMS and call control.

Embodiments of the invention provide that the device adapter component is implemented as a servlet that first detects which platform the mashup is running on, with the help of a 'user-agent' field of the invoking browser. Based on this knowledge, the appropriate JavaScript files containing code for invoking device features are included in the mashup. In addition, embodiments provide for defined CSS files for each mobile device platform type. For example, a set of CSS files would be defined for various mobile platforms that tailor the mashup for the corresponding platform with respect to certain user interface attributes, including, but not limited to, font style and font size. Furthermore, embodiments provide that the device adapter component can selectively disable device features in a mashup where they are not available.

Embodiments of the invention provide that the device listener component may be implemented as a servlet where information from the device can be submitted using a method such as the servlet Post method. As such, embodiments provide that each piece of device data may be stored by the listener using a 3-tuple <mobile phone#, device data, timestamp>. In addition, for this data, the server side middleware can configure access policies related to its usage in a mashup.

According to embodiments of the invention, the following code fragment could enable obtaining location information from the device and sending it to a mashup server:

```
function getLocationUpdates( ){
var locService = new ibmmobilemashups.LocationService( );
locService.startUpdatesOnTimeChange(timeFilter, callback, errorCallback, options);
}
function locationUpdated (location){
var latitude = location.latitude;
var longitude = location.longitude;
...
//Invoke servlet to update location on server
...
}
```

The first function initializes the service for accessing location information, and then calls the startUpdatesOnTimeChange( ) function to get periodic location updates. Every time an update is obtained, a common callback method locationUpdated( ) is invoked that parses the location object and sends updated information to the server through servlet calls.

Embodiments of the invention provide that once a common interface has been realized that hides semantic and syntactic heterogeneities of device features, the task of a developer in terms of porting a mashup across the platforms is significantly reduced. As a non-limiting example, for location updates, the developer does not require knowledge of "provider" in the case of Android™, or "timeout" and "maxage" parameters on Nokia® S60®. In addition, any platform specific attributes can be provided in a consistent manner using the options parameter, as shown in the code described above.

Certain embodiments hide the complexity of using platform specific provisions from developers. As a non-limiting example, using a mashup bridge according to embodiments of the invention, a developer is not required to be concerned with the usage of Intent and IntentReceiver classes for handling callbacks on Android™ Similarly, details of telecom protocols across different standards, such as Parlay-X and CORBA, are shielded from the developer. Accordingly, code developed according to embodiments of the invention becomes easier to develop and debug.

As mobile platforms evolve, new version of a platform may have different APIs, as compared to the previous versions. For example, the recent release 2.0 of the Android™ platform provides a different set of APIs for accessing contact information. Embodiments of the invention provide that such differences can be absorbed inside the mashup framework for newer version of the platform, thereby requiring no changes in the mashup application. Accordingly, mashup applications developed according to embodiments of the invention are easier to maintain as platforms change and evolve.

Embodiments of the invention provide a framework for creating mobile mashups that amalgamate data and offerings from three dimensions: device features, Telecom network, and Web accessible services. Embodiments provide that this framework is established through middleware components, both on the server side as well as the device side, to provide support for mashing device and telecom interfaces. In addition, embodiments provide for portability across different device platforms and different telecom operator networks. Embodiments provide for two-way mobile mashups, utilizing services and features on both the client side (for example, a mobile browser) as well as from the server side, from a three dimensional setting: device features, telecom services, and third party services. A mobile device configured according to embodiments of the invention participates as an active component in the two-way flow of information. As such, embodiments provide for models to incorporate device features, including, but not limited to, the exposure of APIs in mashable format through a mashup bridge and maintaining the portability of mashups across different devices. In addition, embodiments provide for models to integrate telecom network functionality, including, but not limited to hiding underlying protocols and network heterogeneity and exposing mashable interfaces for both client and server side portions of a mashup. Furthermore, enabling this framework according to embodiments of the invention requires middleware components, both on the device and the server. Embodiments of the invention provide middleware components for enabling cross-operator telecom network features that can be utilized during creation of mobile mashups.

It should be noted as well that certain embodiments may be implemented as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer or device, partly on the user's computer or device, as a stand-alone software package, partly on the user's computer or device and partly on a remote computer or entirely on the remote computer or server. In the latter scenario, the remote computer may be connected to the user's computer or device through any type of network, including a local area network (LAN) or a wide area network (WAN), or the connection may be made to an external computer or device (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
   one or more computing devices each having one or more client-side device features, the one or more computing devices configured to communicate device feeds of client-side device feature data;
   one or more communication networks, each of the one or more communication networks having one or more network functionalities;
   one or more web content providers, each of the one or more web content providers having one or more web offerings;
   wherein the one or more client-side device features, the one or more network functionalities, and one or more web offerings are integrated into one or more mashup applications;
   wherein the client-side device features:
   are configured to provide, to the one or more mashup applications, data that has been processed solely at the client side; and
   are segregated from the one or more mashup applications via a bridge.

2. The system according to claim 1, the one or more computing devices are mobile devices.

3. The system according to claim 1, wherein the one or more device features are comprised of one or more of the following: global positioning system, camera, calendar, contacts, and local communication protocols.

4. The system according to claim 1, wherein the one or more communication networks are telecom networks.

5. The system according to claim 1, wherein the one or more network functionalities are comprised of one or more of the following: location, presence, call control, and short message service.

6. The system according to claim 1, wherein the one or more web offerings are comprised of one or more of the following: news, weather, traffic, maps, and social networking.

7. The system according to claim 1, further comprising:
   device mashup middleware running on each of the one or more computing devices, the device mashup middleware comprising a defragmentation layer and a native to mashup bridge;
   wherein the native to mashup bridge exposes application programming interfaces for one or more device features of the one or more computing devices in a web mashable form;
   wherein the defragmentation layer exposes the application programming interfaces from the native to mashup bridge in a portable form.

8. The system according to claim 7, wherein the application programming interfaces are integrated into existing development tools.

9. The system according to claim 1, further comprising one or more servers having two-way communication with the one or more computing devices;
   wherein the one or more servers are configured to receive the device feeds of device data, and access the one or more network functionalities and the one or more web offerings;
   wherein the one or more mashup applications comprise one or more device-side mashup applications and one or more server-side mashup applications, the one or more device-side mashup applications being in two-way communication with the one or more server-side mashup applications; and
   wherein the device data, the one or more network functionalities and the one or more web offerings are integrated into the one or more server-side mashup applications running on the one or more servers.

10. The system according to claim 9, further comprising server mashup middleware running on each of the one or more servers, the server mashup middleware comprising a device block and a telecom block;
   wherein the device block is configured to access the device feeds of device data and perform device specific adaptations of mashup applications;
   wherein the telecom block is configured to access and provide mashable interfaces to the one or more network functionalities.

11. A method comprising:
   providing one or more computing devices each having one or more client-side device features, the one or more computing devices configured to communicate device feeds of client-side device feature data;
   accessing one or more communication networks, each of the one or more communication networks having one or more network functionalities;
   accessing one or more web content providers, each of the one or more web content providers having one or more web offerings;
   wherein the one or more client-side device features, the one or more network functionalities, and one or more web offerings are integrated into one or more mashup applications;

wherein the client-side device features:
are configured to provide, to the one or more mashup applications, data that has been processed solely at the client side; and
are segregated from the one or more mashup applications via a bridge.

12. The method according to claim 11, wherein the computing devices are mobile devices.

13. The method according to claim 11, wherein the one or more device features are comprised of one or more of the following: global positioning system, camera, calendar, contacts, and local communication protocols.

14. The method according to claim 11, wherein the one or more network functionalities are comprised of one or more of the following: location, presence, call control, and SMS.

15. The method according to claim 11, wherein the one or more web offerings are comprised of one or more of the following: news, weather, traffic, maps, and social networking.

16. The method according to claim 11, further comprising:
providing device mashup middleware to run on each of the one or more computing devices, the device mashup middleware comprising a defragmentation layer and a native to mashup bridge;
wherein the native to mashup bridge exposes application programming interfaces of the one or more computing devices in a web mashable form;
wherein the defragmentation layer exposes the application programming interfaces from the native to mashup bridge in a portable form.

17. The method according to claim 16, wherein the application programming interfaces are integrated into existing development tools.

18. The method according to claim 11, further comprising providing one or more servers having two-way communication with the one or more computing devices;
wherein the one or more servers are configured to receive the device feeds of device data, and access the one or more network functionalities and the one or more web offerings;
wherein the device data, the one or more network functionalities and the one or more web offerings are integrated into one or more server mashup applications running on the one or more servers.

19. The method according to claim 18, further comprising:
providing server mashup middleware running on each of the one or more servers, the server mashup middleware comprising a device block and a telecom block;
wherein the device block is configured to access the device feeds of device data and perform device specific adaptations of mashup applications;
wherein the telecom block is configured to access and provide mashable interfaces to the one or more network functionalities.

20. A computer program product comprising:
a computer readable storage medium having computer readable program code embodied therewith, the computer readable program code comprising:
computer readable program code configured to provide one or more computing devices each having one or more client-side device features, the one or more computing devices configured to communicate device feeds of client-side device feature data;
computer readable program code configured to access one or more communication networks, each of the one or more communication networks having one or more network functionalities;
computer readable program code configured to access one or more web content providers, each of the one or more web content providers having one or more web offerings;
wherein the one or more client-side device features, the one or more network functionalities, and one or more web offerings are integrated into one or more mashup applications;
wherein the client-side device features:
are configured to provide, to the one or more mashup applications, data that has been processed solely at the client side; and
are segregated from the one or more mashup applications via a bridge.

* * * * *